United States Patent Office.

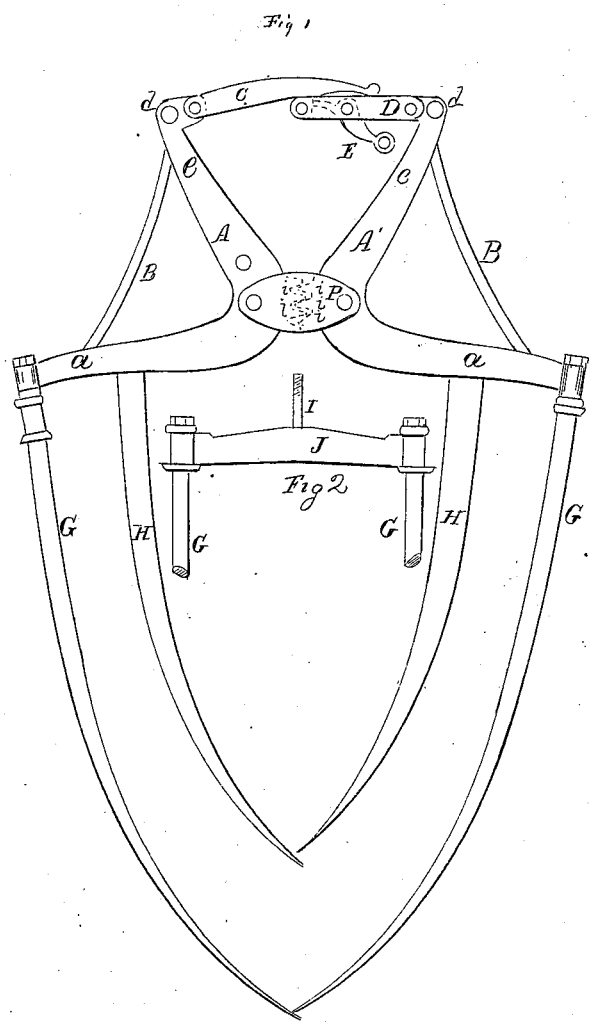

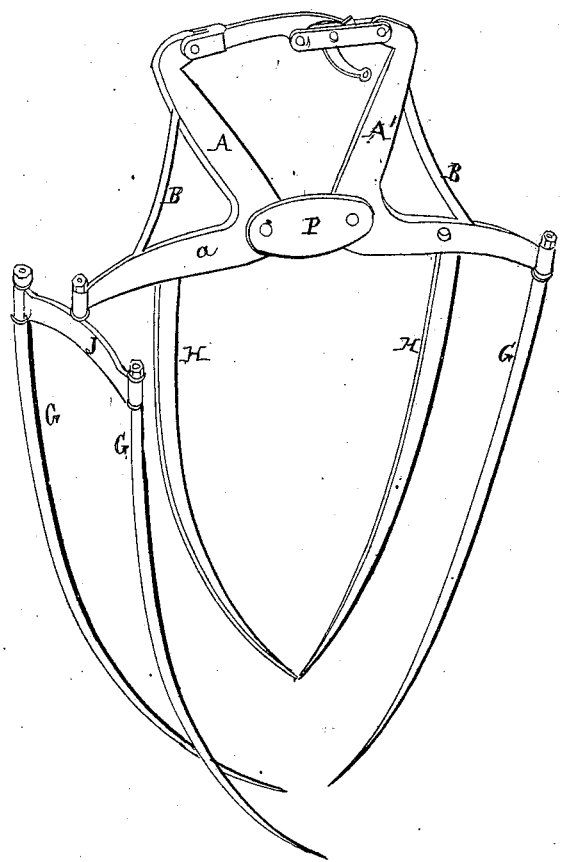

J. B. SWEETLAND, OF PONTIAC, MICHIGAN.

Letters Patent No. 77,125, dated April 21, 1868.

IMPROVEMENT IN HORSE HAY-FORKS.

*The Schedule referred to in these Letters Patent and making part of the same.*

TO ALL WHOM IT MAY CONCERN:

Be it known that I, J. B. SWEETLAND, of Pontiac, in the county of Oakland, and in the State of Michigan, have invented new and useful Improvement in Hay and Manure-Forks; and do hereby declare that the following is a full, clear, and exact description thereof, reference being had to the accompanying drawings, and to the letters of reference marked thereon.

In the annexed drawings, making part of this specification, A A' represent two arms, which are formed in the shape represented, the two ends, $a$ and $e$, of each arm forming a little less than a right angle between them. These arms are provided, near their centres, on their edges which are contiguous, with the gear-teeth $i\ i$, and these teeth gear together. P represents a plate, which is placed over the teeth $i$, and which is pivoted or riveted to each of the arms, and serves to bind them securely together. B B represent braces, which connect the ends of the arms together, and give strength to them. Sockets are formed in the ends $a$ of the arms, and in these sockets the shanks of the tines G G and H H are inserted, and secured by suitable nuts.

It will be seen that I employ two sets of tines, G G being secured at the extremities of the arms, and the tines H H a little distance from them, and nearer toward the centre of the fork. The object in having two sets of tines is that the fork will raise its load of hay with more ease to itself, as there will be less pressure upon their points, and then the hay is kept more securely in position, not being allowed to turn to one side or the other.

I propose to use an arrangement similar to that represented in Figure 2 for the outer tines, using a cross-head, J, with two or more tines secured to it. This cross-head will be provided with a bolt, I, which projects upward from its centre, and which passes through the socket in the end of the arm, for securing it to said arm. To the end $e$ of arm A', I secure, by a pivot, a bar, D, and to the end $e$ of arm A, I pivot a bar, C. These two bars, C and D, are pivoted together at $x$, as seen.

E represents a trip-lever, which is pivoted to the bar D. One end of this lever rests under the bar C, and the other end below bar D, this lower end being provided with a hole, in which a cord will be inserted for tripping the fork, and allowing the hay to slip from its grasp.

It will readily be seen that when the lower or loose ends of the tines are brought together, the pivot $x$, which connects the two bars C and D together, will be a little below a line drawn from the points where the two bars are pivoted to the arms. This being the case, the two arms C and D brace the two upper ends of the arms A and A', so that the tines cannot open. In order to open the tines, it is necessary to operate upon the trip-lever E, which, when its lower end is drawn downward, presses with its upper end against the bar C, so as to throw it upward. As soon as this occurs, the weight of the hay forces open the tines, and it drops from the fork. The fork is suspended by means of chains or ropes, which fasten in the holes $d\ d$ in the arms, and are then secured together a little above the fork. These chains or ropes have, of course, a tendency to throw open the tines as soon as the bars C and D are thrown out of line.

The cross-head J, with two or more tines, can be used with great advantage in lifting manure, as it holds the manure together better than it could be held by single tines.

I design using this fork both as a hay and manure-fork.

Having thus fully described my invention, what I claim as new, and desire to secure by Letters Patent, is—

1. The arms A and A', constructed substantially as represented, and provided with two sets of tines, G G and H H, as and for the purpose set forth.

2. The cross-head J, provided with two or more tines, and adjustably or rigidly connected to the arms A A', as and for the purpose set forth.

In testimony that I claim the foregoing, I have hereunto set my hand, this 26th day of March, 1868.

J. B. SWEETLAND.

Witnesses:
V. D. STOCKBRIDGE,
A. N. MARR.